United States Patent [19]
Townsend et al.

[11] Patent Number: 5,181,051
[45] Date of Patent: Jan. 19, 1993

[54] MAGNETIC REMOVABLE DISPLAY FOR EYEGLASSES

[75] Inventors: Daniel R. Townsend, 8 Lombardy Pl., Towson, Md. 21204; William D. White, Gibson Island, Md.

[73] Assignee: Daniel R. Townsend, Towson, Md.

[21] Appl. No.: 642,467

[22] Filed: Jan. 17, 1991

[51] Int. Cl.⁵ ............................................. G02C 11/02
[52] U.S. Cl. ...................... 351/52; 351/51; 351/158
[58] Field of Search ........................... 351/51, 52, 158

[56] References Cited
FOREIGN PATENT DOCUMENTS 846425 8/1960 United Kingdom .................. 351/52
855268 11/1960 United Kingdom .................. 351/52

*Primary Examiner*—Bruce Y. Arnold
*Assistant Examiner*—J. P. Ryan
*Attorney, Agent, or Firm*—Birch, Stewart, Kolasch & Birch

[57] ABSTRACT

A pair of specified metal glasses for displaying removable magnetic printed matter includes a frame for supporting the lens of the pair of glasses. The frame is of a predetermined thickness for displaying removable printed matter thereon. Temples are provided for extending from the frame for supporting the glasses relative to a wearer's ears. The temples are of a predetermined thickness for displaying removable printed matter thereon. A retaining member is provided for temporarily retaining printed matter relative to at least the frame or the temples for predominantly displaying the printed matter for viewing by others. The retaining member may include a plurality of grooves disposed within a thickness of the frame and temples for mating with corresponding projections extending from the removable printed matter. The retaining member may include a plurality of projections extending from the frame and temples for mating with corresponding grooves disposed within a thickness of the removable printed matter. The retaining member may be a specified metal wherein the removable printed matter is attracted to and temporarily retained on the frames and temples of the glasses.

22 Claims, 2 Drawing Sheets

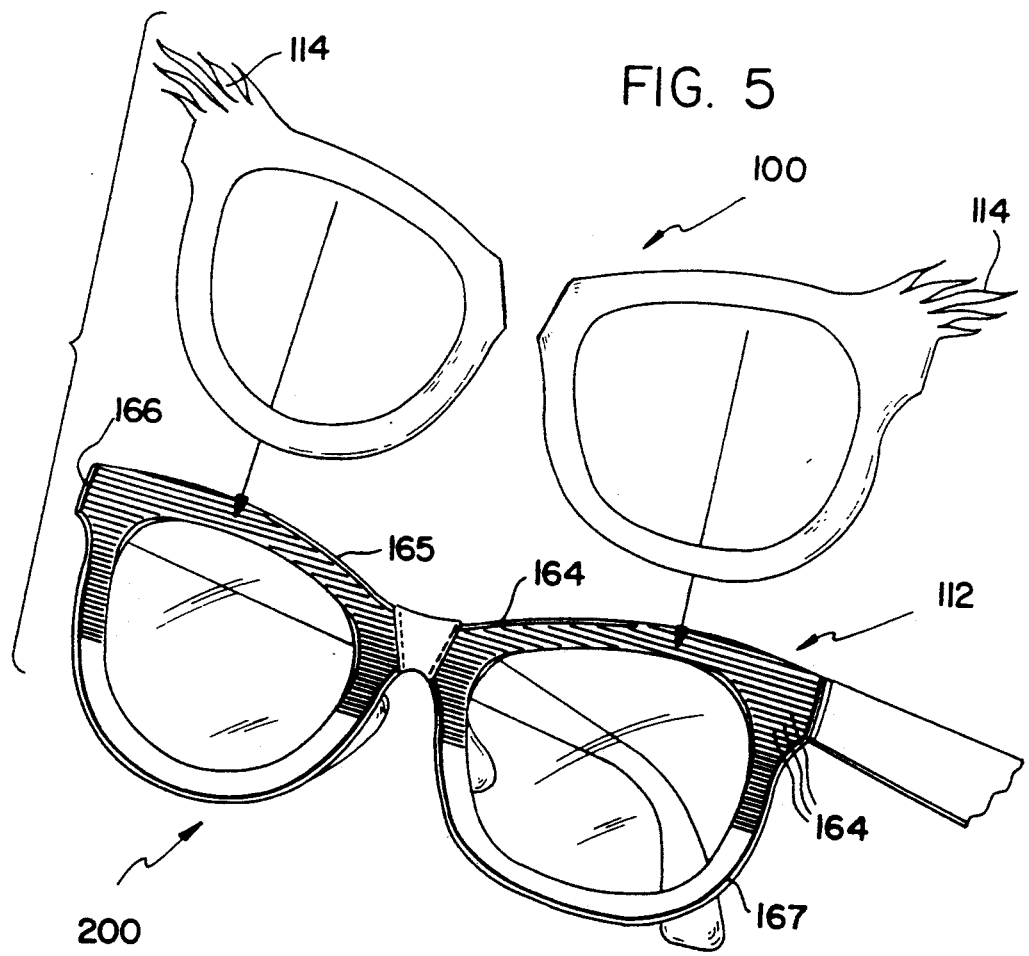
FIG. 5
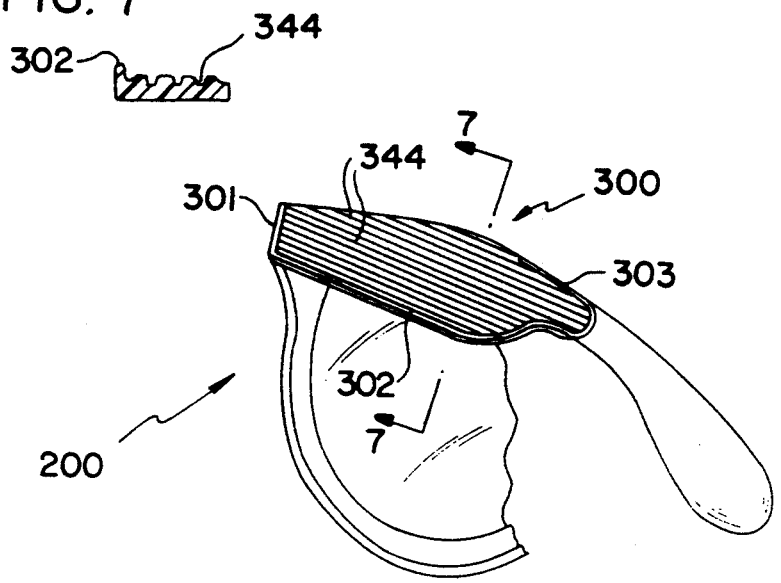
FIG. 7
FIG. 6

MAGNETIC REMOVABLE DISPLAY FOR EYEGLASSES

BACKGROUND OF THE INVENTION

Field of the Invention

The present invention is directed to a magnetic removable display for use with a pair of specially manufactured glasses which includes a frame for supporting the lens and temples extending from the frame for supporting the glasses relative to a wearer's ears. Magnetic retaining means are provided for temporarily retaining a display relative to at least the frame or the temples for predominantly displaying the display for viewing by others.

Description of Background Art

Hithertofore, frames for glasses have been developed which are normally constructed of a predetermined material for use in retaining the lens of the glasses relative to the frame. The frames have been designed in a plurality of various thicknesses and shapes. However, most frames for glasses are designed to merely be used for a single purpose and do not permit a user to readily change the color or ornamental appearance of the frame when desired.

Some ornamental covers for spectacle frames have been developed which are designed to be clamped onto a frame. The ornamental covers do permit an individual to change the appearance of the frame by snapping on a cover to fit over a portion of or to surround the frame which supports the lenses. The snap-on ornamental covers are somewhat cumbersome in view of the fact that they must fit around the frame member to be snapped into place.

SUMMARY AND OBJECTS OF THE PRESENT INVENTION

It is an object of the present invention to provide a removable display for use with a pair of specified metal glasses wherein magnetic retaining means are employed for temporarily retaining the display relative to at least the frame or the temples for predominantly displaying the display for viewing by others.

Another object of the present invention is to provide a removable display for use with a pair of glasses wherein the display may be readily affixed to one side of the frame and thereafter removed therefrom. The removable display is not required to be snapped over the thickness of the frame.

Another object of the present invention is to provide a removable display which may be disposed on the frame for supporting the lenses of the glasses and also, if desired, displayed on the temples extending from the frame for supporting the glasses relative to a wearer's ears.

A further object of the present invention is to provide a removable display for use with a pair of glasses wherein the display portion for securing to the frame which supports the lenses may be nested in tracks and grooves which are manufactured in both the display and the frame.

These and other objects of the present invention are achieved by providing a removable display for use with a pair of glasses which include a specified metal frame for supporting the lenses of the pair of glasses wherein the frame is of a predetermined thickness for displaying the removable display thereon. Temples are provided for extending from the frames for supporting the glasses relative to a wearer's ears. The temples are also of a predetermined thickness for displaying the removable display thereon. Magnetic retaining means are provided for temporarily retaining the display relative to at least the frame or the temples for predominantly displaying the display for viewing by others.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is a an exploded view illustrating a pair of glasses onto which a removable display is positioned on the frame;

FIG. 6 is a perspective view illustrating the tracks and grooves disposed on a temple portion of a pair of glasses; and FIG. 7 is a cross-sectional view of the temple illustrating the grooves and tracks employed on the temple portion taken along line 7—7 of FIG. 6.

DETAILED DESCRIPTION OF THE PREFERRED EMBODIMENTS

Figure 1:
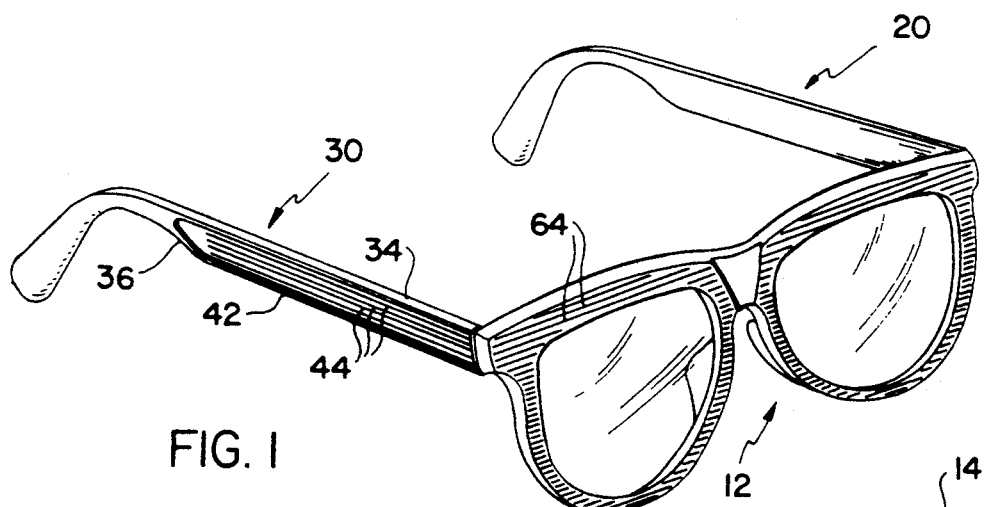
FIG. 1 is a perspective view illustrating the frame and temples of a pair of glasses which may include a removable display secured thereto.
Figure 2:
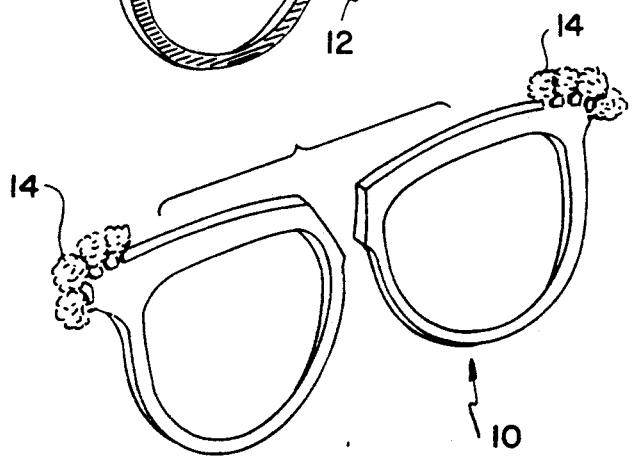
FIG. 2 is a perspective view of a removable display for mounting on the frame portion of the glasses.

As illustrated in FIGS. 1-4, the present invention is directed to a removable display 10 which may be secured to the frame portion 12 for supporting the lenses of a pair of glasses 20. The removable display 10 is designed to be of a predetermined thickness to conform to the configuration of the frame 12 for supporting the lenses of a pair of glasses so as to fit over the frame and to conceal the frame therebehind. The frame 12 may also have a predetermined thickness which corresponds to the predetermined thickness of the removable display 10. The removable display may include artistic ornamental projections 14 extending from the upper right and upper left portions thereof for displaying any ornamental attraction desired. In the embodiment illustrated in FIG. 2, the projections 14 take on the appearance of a floral design and/or a tree design for projecting the image of a tropical theme. The removable display 10 may be of a predetermined color for permitting an individual to change the color of a pair of glasses at a moments notice. A large variety of colors of the removable display 10 may be provided to give an individual a large choice in selecting one of numerous colors for use together with the pair of glasses 20. In addition, the removable display 10 may be of a fabric coating to match clothing and may include printed matter disposed thereon which may have a particular theme related to floral patterns, topographical designs, artistic designs, animal patterns, school logo designs, sports themes, product logos, white material where wearer can create designs, or any of a variety of various designs which may be removably affixed to the pair of glasses.

Figure 3:
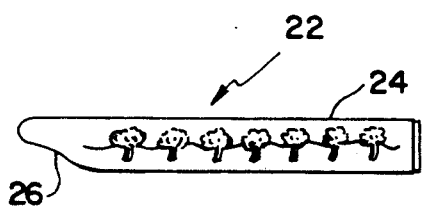
FIG. 3 is a perspective view of a removable display for use on a right temple of a pair of glasses.
Figure 4:
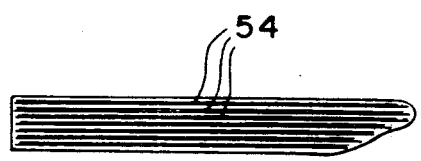
FIG. 4 is a rear view of the removable display for use on a temple portion of a pair of glasses as illustrated in FIG. 3.

FIGS. 3 and 4 illustrate a perspective view of the removable design for securing to a temple portion of the pair of glasses. A removable temple design 22 is provided which includes a straight section 24 and a curved-in section 26. The curved-in section 26 may be designed to mate with a corresponding curved section 36 of a temple portion of a pair glasses. Similarly, the straight section 24 may be designed to mate with a straight portion 34 of the temple 30 of a pair of glasses. Any of a variety of various shapes may be utilized to construct the removable temple display 22 so as to be secured onto a temple 30 of a pair of glasses 20. The temple 30 includes a track 42 which extends along a lower edge of the temple 30. In addition, a plurality of grooves 44 are provided which extend along the length of the temple 30.

As illustrated in FIG. 4, the removable temple design 22 will be constructed of a magnetic material which includes a plurality of projections 54 for mating with the grooves 44 disposed on the temple 30. In this way, the removable temple display 22 is secured to the temple 30 by means of not only the magnetic attraction of the magnetic material to the specified metal frame 30, but also, the interconnection of the projections 54 and the grooves 44 to provide a snug, secure fit for the removable temple display relative to the temple 30. In addition, the track 42 would be provided to ensure that the removable temple display 22 does not slip down off the temple 30.

Similarly, the frame 12 includes a plurality of grooves 64 which extend along the length of the frame 12. The rear portion of the removable frame display 10 would include a plurality of projections for inserting into the grooves 64 to ensure that the removable frame display 10 is securely held relative to the pair of glasses 20.

FIGS. 5-7 illustrate another embodiment of the present invention which include grooves and tracks for securing the removable frame display relative to the glasses. As illustrated in FIG. 5, a removable frame display 100 is provided which includes projections 114 extending from the right and left upper portions thereof. The removable magnetic frame display 100 is designed to be secured on a frame 112 for supporting the lenses of a pair of glasses. The frame 112 includes a plurality of grooves 164 which extend along the length thereof. In addition, tracks 164 and 165 extend along the upper portion of the frame 112. Similarly, a track 166 extends along the side and the lower portion of the right side of the frame of the glasses 200. In addition, a track 167 extends along the side and the lower portion of the left side of the pair of glasses 200. The tracks 164, 165, 166 and 167 are designed to securely retain the removable magnetic frame display 100 when it is affixed to the metallic frame 112 of the pair of glasses 200. The removable magnetic frame display 100 is securely retained on the pair of glasses 200 during normal use. An individual is enabled to remove the removable magnetic frame display 100 for replacement if and when desired.

FIG. 6 illustrates a perspective view of a temple portion 300 of the pair of glasses 200. The temple portion includes a track 301 extending along the left side thereof. A track 302 extends along the lower portion thereof. A track 303 extends along the right portion thereof. The track 301, 302 and 303 is continuous to extend from the left portion along the bottom portion and upwardly adjacent to the right portion of the temple 300 of the pair of glasses 200. In addition, a plurality of grooves 344 are provided which extend along the length of the temple 300. The grooves 344 are designed to mate with projections which extend from the removable temple display.

FIG. 7 is a cross-sectional view taken along line 7—7 of FIG. 6. The cross-sectional view illustrates the track 302 extending along the lower edge of the temple 300. In addition, the grooves 344 are provided within the thickness of the temple for permitting a positive retaining of the removable temple display relative to the temple 300.

In operation, an individual would acquire a specified metal pair of glasses 20, 200 built according to the present invention. The pair of glasses 20, 200 would have a metal frame 12, 112 for securing the lenses of the pair of glasses. The metal frame 12, 112 would have a plurality of grooves and/or grooves and tracks provided within the thickness of the metal frame 12, 112 for mating with projections which extend from the removable magnetic frame display 10, 100 which is secured thereto. Similarly, the pair of metal glasses 20, 200 would include temples 30, 300 extending from the metal frames 12, 112. The temples 30, 300 would include grooves and/or grooves and a track which extend along the length thereof. The grooves and/or grooves and the track are designed to mate with projections extending from the removable magnetic temple display which is secured thereto.

An individual may readily remove the removable magnetic frame and/or temple display from the pair of glasses 20, 200. Thereafter, another distinct display may be affixed thereto. The displays may have one of a plurality of various designs on the removable displays. The present invention is not limited to any particular design which may be considered for use together with the pair of glasses.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A removable display for use with a pair of glasses including a frame for supporting the lens of the pair of glasses, said frame being of a predetermined thickness and predetermined specified metal for displaying the removable display thereon and temples extending from said frames for supporting said glasses relative to a wearer's ears, said temples being of a predetermined thickness for displaying the removable display thereon, the improvement comprising:

magnetic retaining means for temporarily retaining the display relative to at least said frame or said temples for predominantly displaying said display for viewing by others, wherein said magnetic retaining means includes a plurality of grooves disposed within a thickness of said frame and temples for mating with corresponding projections extending from said removable display.

2. The removable display for use with a pair of specified metal glasses according to claim 1, wherein said display extends along said frame and along said temples.

3. The removable display for use with a pair of specified metal glasses according to claim 1, wherein said display includes printed matter.

4. The removable display for use with a pair of specified metal glasses according to claim 1, wherein said display includes printed indicia.

5. A removable display for use with a pair of glasses including a frame for supporting the lens of ht pair of glasses, said frame being of a predetermined thickness and predetermined specified metal for displaying the removable display thereon and temples extending from said frames for supporting said glasses relative to a wearer's ears, said temples being of a predetermined thickness for displaying the removable display thereon, the improvement comprising:
   magnetic retaining means for temporarily retaining the display relative to at least said frame or said temples for predominantly displaying said display for viewing by others,
   wherein said retaining means includes a plurality of projections extending from said frame and temples for mating with corresponding grooves disposed within a thickness of said removable display.

6. The removable display for use with a pair of specified metal glasses according to claim 5, wherein said display extends along said frame and along said temples.

7. The removable display for use with a pair of specified metal glasses according to claim 5, wherein said display is printed matter.

8. The removable display for use with a pair of specified metal glasses according to claim 5, wherein said display includes printed indicia.

9. A removable display for use with a pair of glasses including a frame for supporting the lens of the pair of glasses, said frame being of a predetermined thickness and predetermined specified metal for displaying the removable display thereon and temples extending from said frames for supporting said glasses relative to a wearer's ears, said temples being of a predetermined thickness for displaying the removable display thereon, the improvement comprising:
   magnetic retaining means for temporarily retaining the display relative to at least said frame or said temples for predominantly displaying said display for viewing by others,
   wherein said retaining means includes a track provided within at least a portion of a periphery of said frame and temples for mating with a corresponding peripheral projection extending from said removable display.

10. The removable display for use with a pair of specified metal glasses according to claim 9, wherein said display extends along said frame and along said temples.

11. The removable display for use with a pair of specified metal glasses according to claim 9, wherein said display includes printed matter.

12. The removable display for use with a pair of specified metal glasses according to claim 9, wherein said display includes printed indicia.

13. The removable display for use with a pair of specified metal glasses according to claim 9, wherein said retaining means further includes a plurality of parallel grooves disposed within a thickness of said frame and temples for mating with corresponding projections extending from said removable display.

14. The removable display for use with a pair of specified metal glasses according to claim 13, wherein said display extends along said frame and along said temples.

15. The removable display for use with a pair of specified metal glasses according to claim 13, wherein said display includes printed matter.

16. The removable display for use with a pair of specified metal glasses according to claim 13, wherein said display includes printed indicia.

17. A removable display for use with a pair of glasses, the glasses including a frame for supporting the lens of the pair of glasses, said frame being of a predetermined thickness and predetermined specified metal for displaying the removable display thereon and temples extending from said frames for supporting said glasses relative to a wearer's ears, said temples being of a predetermined thickness for displaying the removable display thereon, the improvement comprising:
   magnetic retaining means for temporarily retaining the display relative to at least said frame or said temples for predominantly displaying said display for viewing by others, wherein said magnetic retaining means is magnetized over an entirety of a planar contact surface of the removable display, thereby improving retention of said removable display against at least said frame or said temples.

18. The removable display for use with a pair of specified metal glasses according to claim 17, wherein said magnetic retaining means includes a plurality of grooves disposed within a thickness of said frame and temples for mating with corresponding projections extending from said removable display.

19. The removable display for use with a pair of specified metal glasses according to claim 17, wherein said retaining means includes a plurality of projections extending from said frame and temples for mating with corresponding grooves disposed within a thickness of said removable display.

20. The removable display for use with a pair of specified metal glasses according to claim 17, wherein said display extends along said frame and along said temples.

21. The removable display for use with a pair of specified metal glasses according to claim 17, wherein said display includes printed matter.

22. The removable display for use with a pair of specified metal glasses according to claim 17, wherein said display includes printed indicia.

* * * * *